United States Patent
Choi

(10) Patent No.: US 9,886,127 B2
(45) Date of Patent: Feb. 6, 2018

(54) TOUCH PANEL AND IMAGE DISPLAY DEVICE INCLUDING THE SAME

(71) Applicant: DONGWOO FINE-CHEM CO., LTD., Jeollabuk-do (KR)

(72) Inventor: Byung Jin Choi, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 15/357,264

(22) Filed: Nov. 21, 2016

(65) Prior Publication Data

US 2017/0147132 A1    May 25, 2017

(30) Foreign Application Priority Data

Nov. 25, 2015    (KR) .................. 10-2015-0165530

(51) Int. Cl.
    *G06F 3/041* (2006.01)
    *G06F 3/044* (2006.01)

(52) U.S. Cl.
    CPC ............ *G06F 3/0416* (2013.01); *G06F 3/044* (2013.01); *G06F 2203/04103* (2013.01); *G06F 2203/04112* (2013.01)

(58) Field of Classification Search
    CPC .................. G06F 3/0416; G06F 3/044; G06F 2203/04112; G06F 2203/04103
    See application file for complete search history.

(56) References Cited

U.S. PATENT DOCUMENTS

| | | | |
|---|---|---|---|
| 2013/0181912 A1* | 7/2013 | Oh | G06F 3/044 345/173 |
| 2013/0285939 A1* | 10/2013 | Kim | G06F 3/041 345/173 |
| 2015/0077651 A1* | 3/2015 | Yamagishi | G06F 3/044 349/12 |
| 2015/0317008 A1* | 11/2015 | Chandran | G06F 3/044 345/174 |

FOREIGN PATENT DOCUMENTS

KR    2013-0078065 A    7/2013

* cited by examiner

*Primary Examiner* — Andrew Sasinowski
(74) *Attorney, Agent, or Firm* — The PL Law Group, PLLC

(57) ABSTRACT

A touch panel comprises a substrate and a touch sensing electrode formed on at least one surface of the substrate. The touch sensing electrode includes a first sensing pattern formed in a first direction, a second sensing pattern formed in a second direction, a first relay pattern formed at an inside of the first sensing pattern in an island form, a second relay pattern formed between the first sensing pattern and the second sensing pattern, and a connection pattern which electrically connect separated unit patterns of the second sensing pattern via the first relay pattern and the second relay pattern. The connection pattern includes a first connection pattern which connects the first relay pattern and the second relay pattern, and a second connection pattern which connects the second relay pattern and the unit pattern of the second sensing pattern.

15 Claims, 6 Drawing Sheets

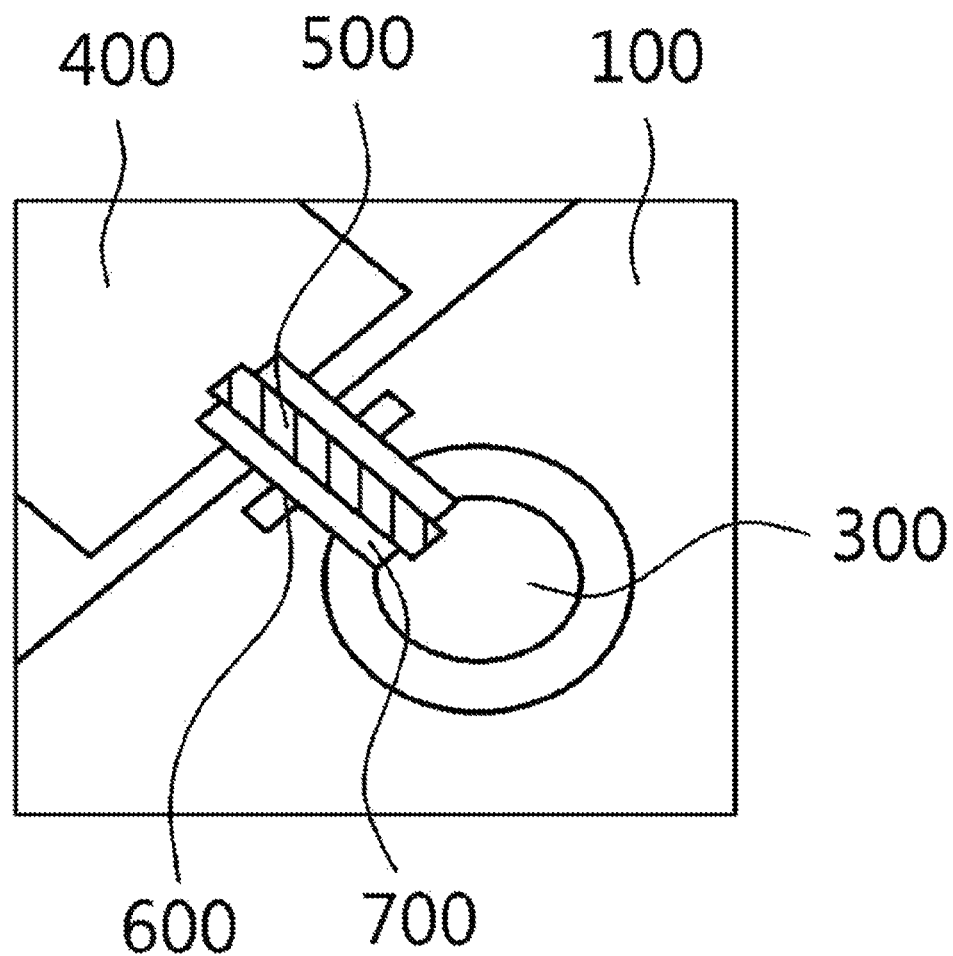

TOUCH PANEL AND IMAGE DISPLAY DEVICE INCLUDING THE SAME

CROSS REFERENCE TO RELATED APPLICATIONS AND CLAIM OF PRIORITY

The application claims the benefit of Korean Patent Application No. 10-2015-0165530, filed on Nov. 25, 2015, at the Korean Intellectual Property Office, the disclosures of which are incorporated by reference herein in their entirety.

BACKGROUND

1. Field

Embodiments of the present invention relates to a touch panel and an image display device including the same.

2. Description of the Related Art

A touch screen panel is a screen panel equipped with a specific input device adapted to receive position input generated by touching the screen panel with a finger of a user, or the like. Such a touch screen panel does not use a keyboard but has a configuration of multi-layer laminates in which, when the finger of the user or an object such as a touch pen touches a specific character or position displayed on a screen, the touch screen panel identifies the position and directly receives data input from the screen, so as to perform a specific information process by a software stored therein.

To recognize the touched position without degrading the visibility of an image displayed on the screen, a transparent touch sensing electrode in which sensing patterns are formed in a predetermined pattern is required.

The sensing pattern may include first patterns and second patterns. The first patterns and the second patterns may be arranged in different directions from each other to provide information on X coordinate and Y coordinate of a touched point, respectively. In detail, when a user touches a point on a cover window substrate with his finger or an object such as a touch pen, information of the touched point is detected and transferred to a driving circuit via the first patterns, second patterns and position detecting lines as a change in capacitance depending on a contact position. Then, the change in capacitance is converted to an electrical signal by X and Y input processing circuits, to identify the contact position.

Currently, an indium-tin oxide (ITO), a conductive polymer, or the like, are generally used as a transparent touch sensing electrode of the capacitive-type touch panel. However, the electrode formed of the ITO, conductive polymer, or the like may have a high surface resistance, and a decrease in touch sensitivity and accuracy due to a difference in the surface resistance between the first pattern and the second pattern may be caused. In addition, in a case of using a bridge electrode, transmittance of the touch panel may be reduced.

Korean Patent Laid-Open Publication No. 2013-0078065 discloses a touch panel including first patterns and second patterns which are formed on an upper surface and a lower surface of a transparent substrate, however, fails to suggest a solution in regard to the above-mentioned problems.

SUMMARY

Embodiments of the present invention provide a touch panel having a reduced a resistance difference between touch sensing electrodes.

Embodiments of the present invention also provide an image display device including the touch panel.

The above objects of the present invention will be achieved by the following characteristics:

(1) A touch panel comprising: a substrate; and a touch sensing electrode formed on at least one surface of the substrate, the touch sensing electrode including: a first sensing pattern formed in a first direction; a second sensing pattern formed in a second direction; a first relay pattern formed at an inside of the first sensing pattern in an island form; a second relay pattern formed between the first sensing pattern and the second sensing pattern; and a connection pattern which electrically connect separated unit patterns of the second sensing pattern via the first relay pattern and the second relay pattern, wherein the connection pattern includes a first connection pattern which connects the first relay pattern and the second relay pattern, and a second connection pattern which connects the second relay pattern and the unit pattern of the second sensing pattern.

(2) The touch panel according to the above (1), wherein the connection pattern is formed in a pair to connect the separated unit patterns of the second sensing pattern adjacent to each other.

(3) The touch panel according to the above (1), further comprising an insulation layer interposed between the connection pattern and the first sensing pattern.

(4) The touch panel according to the above (1), further comprising an auxiliary electrode pattern formed on one surface of the first sensing pattern.

(5) The touch panel according to the above (4), wherein the auxiliary electrode pattern extend on a portion having a narrowed width of the first sensing pattern around the first relay pattern.

(6) The touch panel according to the above (4), wherein the auxiliary electrode pattern and the connection pattern are disposed on one side of the first sensing pattern.

(7) The touch panel according to the above (6), wherein the auxiliary electrode pattern is divided at an intersecting portion of the connection pattern and the auxiliary electrode pattern.

(8) The touch panel according to the above (4), wherein the auxiliary electrode pattern is formed in dot patterns.

(9) The touch panel according to the above (4), further comprising an insulation layer interposed between the connection pattern and the auxiliary electrode pattern.

(10) The touch panel according to the above 4, wherein the auxiliary electrode pattern is disposed on one surface of the first sensing pattern, and the connection pattern is disposed on the other surface of the first sensing pattern.

(11) The touch panel according to the above 4, wherein the auxiliary electrode pattern and the connection pattern are formed of the same material.

(12) The touch panel according to the above 1, wherein the first sensing pattern includes a connection portion which connects respective unit patterns thereof, and the connection portion includes an auxiliary electrode pattern.

(13) The touch panel according to the above 1, wherein the first sensing pattern and the second sensing pattern are disposed on the same surface of the substrate.

(14) The touch panel according to the above 1, further comprising a dummy pattern between the first sensing pattern and the second sensing pattern.

(15) An image display device comprising the touch panel according to the above (1) to (14).

The touch panel according to embodiments of the present invention includes the relay patterns and the connection patterns which have a specific structure, so that an electrical connection between the separated unit patterns of the touch sensing electrode may be maintained while reducing a resistance deviation between the touch sensing electrodes.

The touch panel according to embodiments of the present invention includes the auxiliary electrode patterns, so that sensitivity and accuracy of the electrodes may be improved by equally or similarly maintaining the resistance between the first sensing pattern and the second sensing pattern.

The touch panel according to embodiments of the present invention has reduced visibility of a structure for electrically connecting the touch sensing electrodes so that an influence to a displayed image may be reduced.

BRIEF DESCRIPTION OF THE DRAWINGS

The above and other objects, features and other advantages of the present invention will be more clearly understood from the following detailed description taken in conjunction with the accompanying drawings, in which:

FIGS. 3A to 3C include enlarged views illustrating a portion of a touch panel according to some embodiments of the present invention.

DETAILED DESCRIPTION

Figure 1:
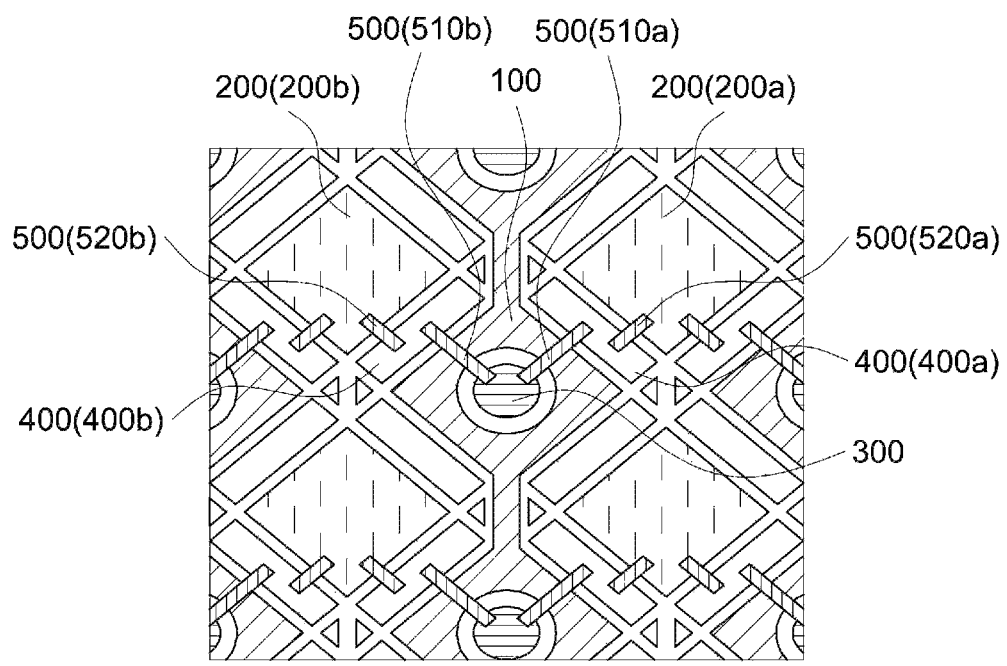
FIGS. 1 and 2 are plan views schematically illustrating configurations of touch panels according to some embodiments of the present invention.

The present invention discloses a touch panel and an image display device including the same. The touch panel includes a touch sensing electrode formed on at least one surface of a substrate. The touch sensing electrode includes: first sensing patterns arranged in a first direction; second sensing patterns arranged in a second direction; first relay patterns formed at an inside of the first sensing patterns in an island form; second relay patterns formed between the first sensing patterns and the second sensing patterns; and connection patterns having a specific structure to electrically connect separated unit patterns of the second sensing patterns through the first relay patterns and the second relay patterns. Thus, an electrical connection between the separated unit patterns of the touch sensing electrode may be realized while improving sensitivity and accuracy of the electrode by reducing a resistance deviation between the touch sensing electrodes, and decreasing an influence on an image to be achieved by reducing visibility of a structure for electrically connecting the unit patterns.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

Commonly, a touch sensing electrode detects an X coordinate and a Y coordinate of a touched point to provide information thereon. In detail, when a user touches a point on a cover window substrate with his finger or an object such as a touch pen, a change in capacitance generated from first sensing patterns for detecting the X coordinate and second sensing patterns for detecting the Y coordinate is transferred to a driving circuit side via position detecting lines. Then, the change in capacitance is converted to an electrical signal by X and Y input processing circuits, to identify a contact position.

In the touch sensing electrode, an insulation between the first sensing pattern and the second sensing pattern may be required, such that the respective sensing patterns may be formed on different layers from each other, or may be separately formed so as to be insulated when they are formed on the same layer. For example, the first sensing patterns may be formed in a first direction (row direction), and the second sensing patterns may be formed in a second direction (column direction). The second sensing pattern may include unit patterns separated or isolated from each other for being insulated from the first sensing electrodes. The unit patterns of the second sensing pattern may be electrically connected with each other through separate bridge electrodes. In this case, however, a resistance deviation between the first sensing pattern and the second sensing pattern may occur to cause a reduction of touch sensitivity and accuracy when calculating the coordinates in the driving circuit.

According to example embodiments of the present invention, by using relay patterns and connection patterns which have a specific structure in order to electrically connect the separated unit patterns of the touch sensing electrode, the sensitivity and accuracy of the electrodes may be improved by reducing the resistance deviation between the touch sensing electrodes, and an image quality of a display device may be enhanced by disposing the above-described structures in a reduced visible configuration.

FIG. 1 is a plan view schematically illustrating a touch panel according to an embodiment of the present invention.

Referring to FIG. 1, the touch panel according to embodiments of the present invention includes a touch sensing electrode formed on at least one surface of a substrate. The touch sensing electrode includes: first sensing patterns 100 formed in a first direction; second sensing patterns 200 formed in a second direction; first relay patterns 300 formed at an inside of the first sensing patterns 100 in an island form; second relay patterns 400 formed between the first sensing patterns 100 and the second sensing patterns 200; and connection patterns 500 which electrically connect separated unit patterns 200a and 200b of the second sensing patterns 200 through the first relay patterns 300 and the second relay patterns 400.

For convenience of descriptions, FIG. 1 illustrates that one first relay pattern 300 is provided in a unit pattern of the first sensing pattern 100. However, a plurality of first relay patterns 300 may be formed in the unit pattern of the sensing pattern, and each of the first relay patterns 300 may be provided with a group of second relay patterns 400 and connection patterns 500 which are respectively connected thereto.

Touch Sensing Electrode

The first sensing patterns 100 and the second sensing patterns 200 according to embodiments of the present invention may be configured to detect X coordinates and Y coordinates, respectively, and may be arranged in different directions from each other. For example, the first sensing patterns 100 may include respective unit patterns which are connected with each other through connection portions along the first direction, and respective unit patterns of the second sensing patterns 200 may be formed in an island form to be isolated from each other along the second direction. Accordingly, the relay patterns 300 and 400, and the connection patterns 500 are disposed at predetermined positions to electrically connect the unit patterns 200a and 200*b* of the second sensing pattern 200. The relay patterns 300 and 400, and the connection patterns 500 will be described below.

A shape of the sensing patterns 100 and 200 is not particularly limited, and the respective unit patterns may independently have a shape of, e.g., a triangle, quadrangle, pentagonal, hexagonal or heptagonal, etc.

In addition, the sensing patterns 100 and 200 may be a regular pattern. The regular pattern means that the form of the pattern has regularity. For example, the respective unit patterns may have a rectangle, quadrangle or hexagonal shape and may be arranged in a mesh shape. Alternatively, the sensing patterns 100 and 200 may be an irregular pattern. The irregular pattern means that the form of the pattern does not have regularity.

The unit pattern of the sensing patterns 100 and 200 may have a surface resistance of 50 to 600Ω/□. If the surface resistance thereof is less than 50Ω/□, transmittance may be reduced to decrease resolution. If the surface resistance thereof exceeds 600Ω/□, touch sensitivity may be decreased. If the sensing patterns 100 and 200 have the mesh shape, the unit pattern may have a lower surface resistance of 1 to 30Ω/□.

A method of controlling the surface resistance of the sensing patterns 100 and 200 is not particularly limited, and may be performed by any method known in the related art. For example, the surface resistance thereof may be controlled by changing a material thereof, mixing another material therewith, changing a thickness and an area of the patterns, or the like.

A material for forming the sensing patterns 100 and 200 is not particularly limited, but may include a material having appropriate conductivity such as a metal oxides, a metal, a metal nanowire, a carbon-based material, a conductive polymer, or the like, which may be used alone or in a combination thereof.

For example, the sensing patterns 100 and 200 may be formed of a metal oxide selected from a group consisting of indium tin oxide (ITO), indium zinc oxide (IZO), indium zinc tin oxide (IZTO), aluminum zinc oxide (AZO), gallium zinc oxide (GZO), fluorine tin oxide (PTO), indium tin oxide-silver-indium tin oxide (ITO-Ag-ITO), indium zinc oxide-silver-indium zinc oxide (IZO-Ag-IZO), indium zinc tin oxide-silver-indium zinc tin oxide (IZTO-Ag-IZTO) and aluminum zinc oxide-silver-aluminum zinc oxide (AZO-Ag-AZO); a metal selected from a group consisting of gold (Au), silver (Ag), copper (Cu), molybdenum (Mo) and APC; a metal nanowire selected from a group consisting of gold, silver, copper and lead; a carbon-based material selected from a group consisting of carbon nanotube (CNT) and graphene; and a conductive polymer selected from a group consisting of poly(3,4-ethylenedioxythiophene) (PEDOT) and polyaniline (PANI).

Since the sensing patterns 100 and 200 are commonly formed of the same material, a resistance value of the respective sensing patterns 100 and 200 may be changed depending on the shape (thickness or area) of the patterns. As a resistance deviation between the first sensing pattern 100 and the second sensing pattern 200 becomes greater, touch sensitivity and accuracy may be degraded. Therefore, it is preferable to form the sensing patterns in an appropriate shape so as to reduce the resistance deviation.

Hereinafter, the relay patterns 300 and 400, and the connection patterns 500, which may be structures for reducing the resistance deviation between the sensing patterns 100 and 200 according to embodiments of the present invention, will be described.

Relay Pattern

The relay patterns 300 and 400 according to embodiments of the present invention may serve as an intermediate member to electrically connect the respective unit patterns of the second sensing pattern 200. Herein, the first relay pattern 300 may be formed at an inside of the first sensing pattern 100 in an island shape, and the second relay pattern 400 may be formed between the first sensing pattern 100 and the second sensing pattern 200.

First Relay Pattern 300

Commonly, a bridge electrode may be used for electrically connecting the separated unit patterns. The bridge electrode may extend from one unit pattern of the second sensing pattern 200 to the other unit pattern of the second sensing pattern 200 neighboring each other across the first sensing pattern 100, to connect the unit patterns of the second sensing pattern with each other. In this case, the length of the bridge electrode may become greater to increase visibility thereof, and an overlapping portion with the first sensing pattern 100 may be increased to cause a reduction of touch sensitivity.

Therefore, in the present invention, by using the first relay patterns 300 formed inside of the first sensing pattern 100 with being insulated therefrom, the connection pattern 500 (bridge electrode) for electrically connecting the unit patterns of second sensing pattern 200 is overlapped with only a portion of the first sensing patterns 100, such that the above-described problem may be solved by reducing the length of the connection pattern 500 (see FIG. 1).

According to embodiments of the present invention, the first relay pattern 300 may be formed at an inside of the first sensing pattern 100 with being insulated therefrom, and connected with at least two second relay patterns 400 via the connection patterns 500 to be described below. For example, the first relay pattern 300 may be connected with the second relay pattern 400*a* for a connection with the unit pattern 200*a* of the second sensing pattern which is disposed on one side with respect to the first sensing pattern 100 having the first relay pattern 300 formed therein, and the second relay pattern 400*b* for a connection with the unit pattern 200*b* of the second sensing pattern 200 which is disposed on the other side with respect to the first sensing pattern 100.

A shape of the first relay pattern 300 is not particularly limited, but may be, e.g., a triangle, quadrangle, pentagonal, hexagonal or heptagonal pattern, and the like. The shape of the first relay pattern 300 may be properly selected to be disposed at the inside of the first sensing pattern 100.

A size of the first relay pattern 300 is not particularly limited, but since the first relay pattern 300 is disposed inside of the first sensing pattern 100, if the size thereof is excessively large, a sensing function of the sensing pattern may be deteriorated. Therefore, the first relay pattern 300 may be formed in a range of 0.01 to 30%, preferably, 0.1 to 1.0%, and more preferably, 0.1 to 0.5% of an area of the unit pattern of the first sensing pattern 100. Within the above range, the connection pattern 500 may be easily connected without degrading the function of the sensing pattern.

A material for forming the first relay pattern 300 is not particularly limited, but may include the same material as that of the above-described sensing pattern as described above, and a material having transparency may be preferably used.

Second relay pattern 400

According to embodiments of the present invention, the second relay pattern 400 is formed between the first sensing pattern 100 and the second sensing pattern 200, and may serve as an intermediate member for electrically connecting the respective unit patterns of the second sensing pattern 200, and may serve as a dummy pattern for reducing visibility due to a difference in transmittance between a portion in which the pattern is not formed and the pattern in a display region.

Further, additional parallel current paths may be formed in the first sensing pattern 100 and the second sensing pattern 200 by the second relay pattern 400 so that the resistance deviation between the first sensing pattern 100 and the second sensing pattern 200 may be reduced.

The second relay patterns 400 may be respectively disposed at an interval between the first sensing pattern 100 and the unit patterns 200a and 200b of the second sensing pattern 200 which are disposed on both sides with respect to the first sensing pattern 100. For example, one second relay pattern 400a may be disposed between the unit pattern 200a of the second sensing pattern which is disposed on one side with respect to the first sensing pattern 100 and the first sensing pattern 100, and another second relay pattern 400b may be disposed between the unit pattern 200b of the second sensing pattern which is disposed on the other side with respect to the first sensing pattern 100 and the first sensing pattern 100.

The second relay patterns 400a and 400b may be respectively connected with the first relay pattern 300 and the unit patterns 200a and 200b of the second sensing pattern by the connection patterns 500 to be described below, and the connection patterns 500 may be formed in a pair to be connected with the first relay pattern 300 and the unit patterns 200a and 200b.

Referring to FIG. 1, the second relay pattern 400a which is disposed on one side with respect to the first sensing pattern 100 may be connected with the first relay pattern 300 by a first connection pattern 510a, and the second relay pattern 400a is connected with the unit pattern 200a by a second connection pattern 510b. Also, the second relay pattern 400b which is disposed on the other side with respect to the first sensing pattern 100 may be connected with the first sensing pattern 100 and the unit pattern 200b in substantially the same construction as that of the second relay pattern 400a.

A shape of the second relay pattern 400 is not particularly limited, but the second relay pattern 400 may be formed in an appropriate shape along a boundary area between the first sensing pattern 100 and the second sensing pattern 200 for serving as the dummy pattern.

A material for forming the second relay pattern 400 according to embodiments of the present invention is not particularly limited, but a material having appropriate conductivity substantially the same as or similar to that of the first relay pattern 300 may be also used, and a material having transparency may be preferably used.

Connection Pattern

The connection pattern 500 according to embodiments of the present invention is configured to electrically connect the separated unit patterns 200a and 200b of the second sensing pattern 200 via the first relay pattern 300 and the second relay pattern 400.

The connection pattern 500 according to the present invention may include a first connection pattern 510 (denoted by numerals of 510a and 510b) which connects the first relay pattern 300 and the second relay pattern 400, and a second connection pattern 520 (denoted by numerals of 520a and 520b) which connects the second relay pattern 400 and the unit patterns 200a and 200b of the second sensing pattern 200.

Figure 2:
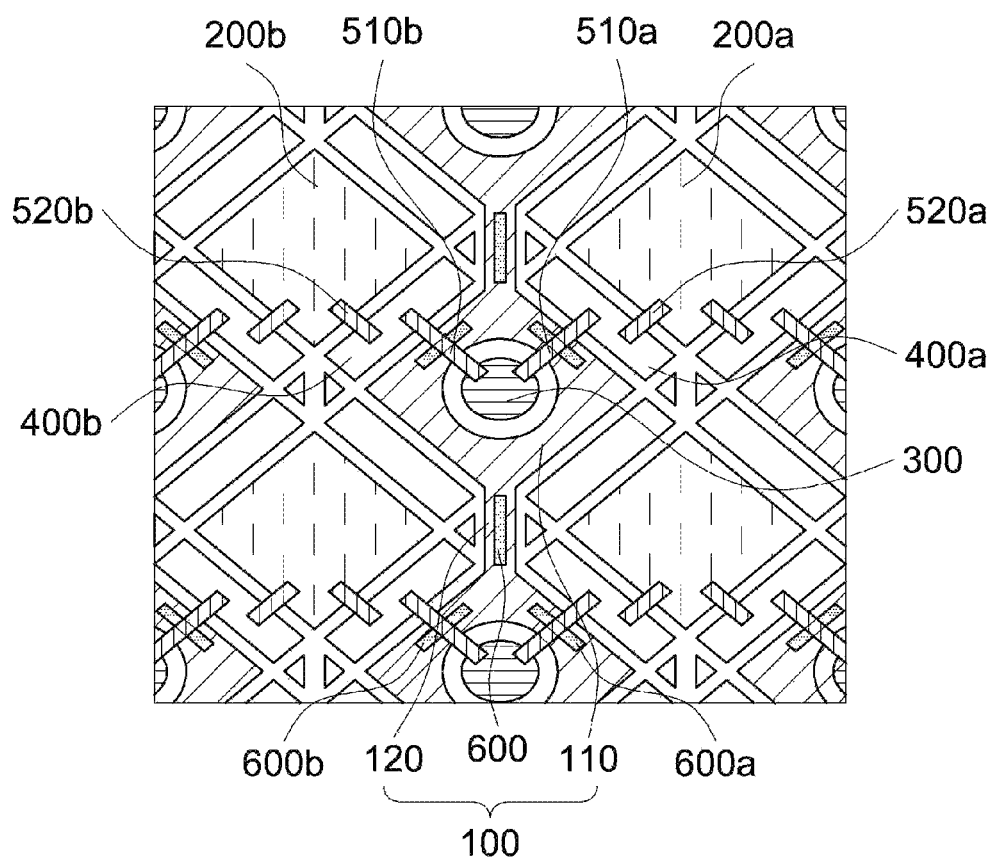

The connection pattern 500 may be formed in a pair to connect two unit patterns 200a and 200b of the second sensing pattern 200 adjacent to each other. Referring to FIG. 2, the connection pattern 500 may include a pair of first connection patterns 510a and 510b which connect the first relay pattern 300 and the second relay patterns 400a and 400b which are disposed on both sides of the first sensing pattern 100 having the first relay pattern 300 formed therein, and a pair of second connection patterns 520a and 520b which connect the respective second relay patterns 400a and 400b and the unit patterns 200a and 200b which are disposed on both sides thereof.

A shape of the connection pattern 500 is not particularly limited, but the connection pattern 500 may be formed in a linear form capable of achieving a sufficient electrical connection and reducing visibility, and preferably, may extend diagonally in a plan view.

A material for forming the connection pattern 500 is not particularly limited, but the material having appropriate conductivity substantially the same as or similar to that of the first relay pattern 300 may be also used, and a material having transparency and lower resistance may be preferably used from an aspect of improving the sensing sensitivity and decreasing the visibility.

Since the connection pattern 500 according to embodiments of the present invention is adapted to electrically connect the respective separated unit patterns of the second sensing pattern 200 with each other, an insulation from the first sensing pattern 100 may be required. Thus, these patterns may be formed in different layers from each other, or an insulation layer 700 may be further interposed between the connection pattern 500 and the first sensing pattern 100.

Auxiliary Electrode Pattern

According to embodiments of the present invention, the touch panel may further include an auxiliary electrode pattern 600 on one surface of the first sensing pattern 100 so that the resistance deviation generated between the first sensing pattern 100 and the second sensing pattern 200 may be controlled as illustrated in FIG. 2.

The first sensing pattern 100 may include the first relay pattern 300 therein, and thus a portion of the first sensing pattern 100 at both sides of the first relay pattern 300 may have a relatively narrow width, and the resistance may increase at the portion having the narrow width to increase the resistance deviation with the second sensing pattern 200.

Therefore, in embodiments of the present invention, the auxiliary electrode pattern 600 may be disposed to pass through the portion having the narrowed width of the first sensing pattern 100 near the first relay pattern 300. Therefore, from, e.g., a synergistic effect of the second relay pattern 400 and the auxiliary electrode pattern 600, the resistance deviation between the respective sensing patterns may be significantly reduced to improve the sensitivity and accuracy of the electrodes.

In the touch panel according to embodiments of the present invention, the first relay pattern 300 may be formed as an island form at an inside of the first sensing pattern 100, and the portions having the narrowed width may be generated in the first sensing pattern 100 at, e.g., both sides of the first relay pattern 300. Thus, the auxiliary electrode pattern 600 may be formed at the portions having the narrowed width in a pair.

Referring to FIG. 2, one auxiliary electrode pattern 600a may be disposed at a portion connected with the second relay pattern 400a of one side with respect to the first relay pattern 300, and another auxiliary electrode pattern 600b may be disposed at a portion connected with the second relay pattern 400*b* of the other side with respect to the first relay pattern 300.

The auxiliary electrode pattern 600 may be insulated from the second sensing pattern 200, and may be also insulated from the connection pattern 500.

According to one embodiment of the present invention, the auxiliary electrode pattern 600 and the connection pattern 500 may be formed on different layers and insulated from each other. For example, the auxiliary electrode pattern 600 may be disposed on one side of the first sensing pattern 100, and the connection pattern 500 may be disposed on the other side of the first sensing pattern 100.

Further, according to another embodiment of the present invention, the auxiliary electrode pattern 600 and the connection pattern 500 may be disposed on the same surface as each other. In this case, for insulation of each member, an insulation layer may be interposed between the auxiliary electrode pattern 600 and the connection pattern 500, or a portion of the auxiliary electrode pattern 600 intersecting the connection pattern 500 may be separated or isolated.

Figure 3B:
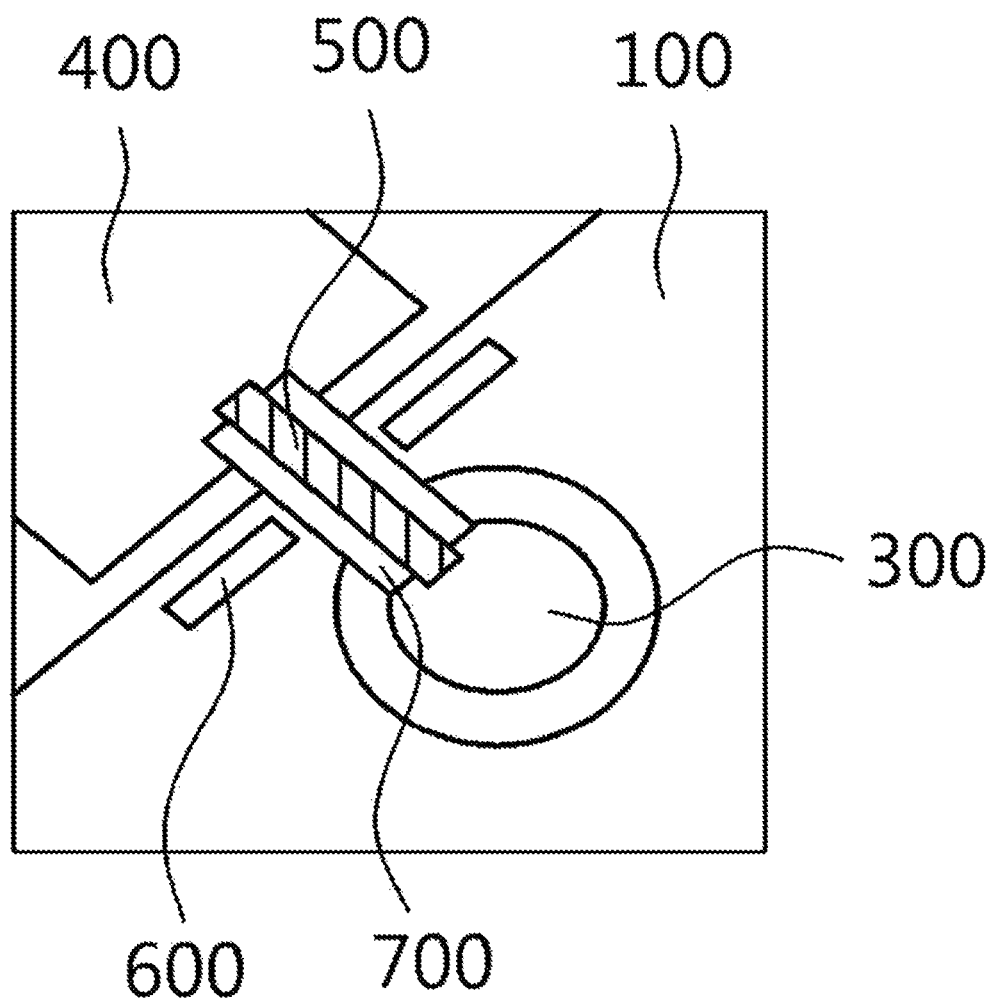
Figure 3C:
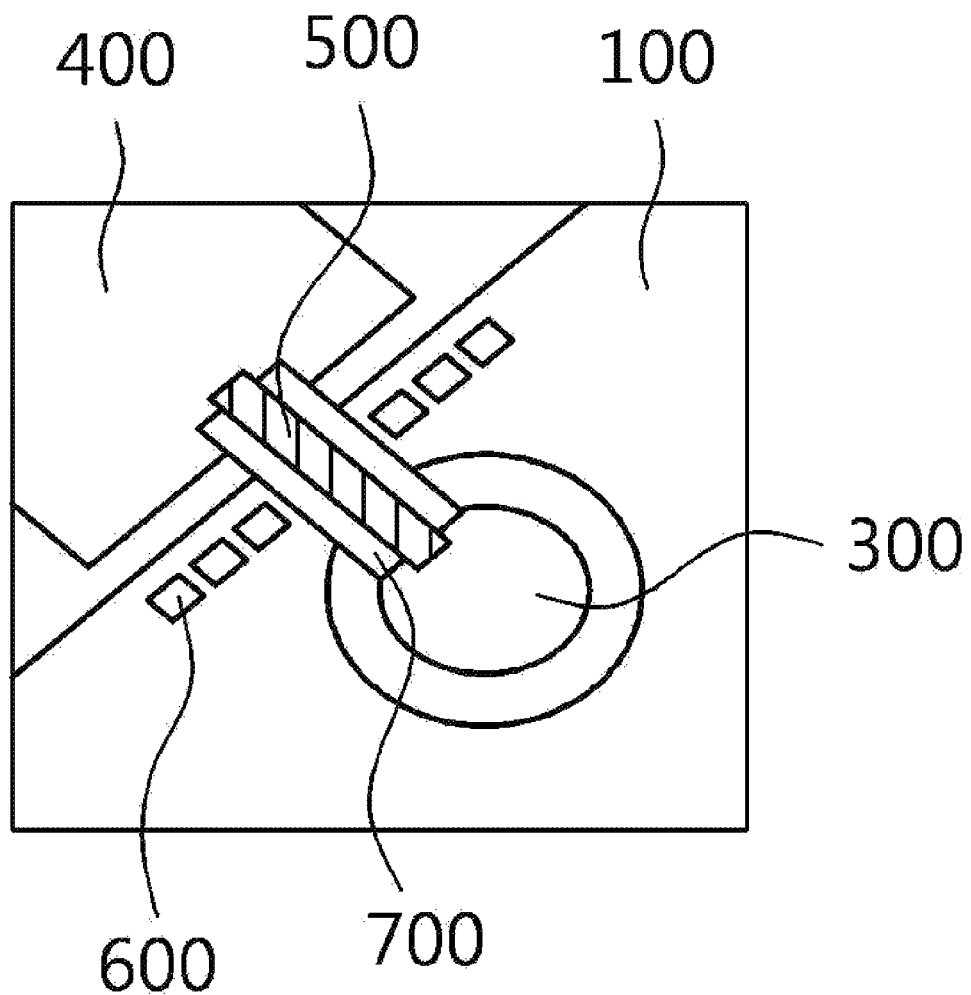

FIGS. 3A to 3C schematically illustrate a case in which the auxiliary electrode pattern 600 and the connection pattern 500 are formed in the same surface as each other in the touch panel.

As illustrated in FIG. 3A, an additional insulation layer 700 may be interposed between the auxiliary electrode pattern 600 and the connection pattern 500.

As illustrated in FIG. 3B, the auxiliary electrode pattern 600 may be divided or isolated at the portion thereof intersecting the connection pattern 500. In this case, the insulation layer between the auxiliary electrode pattern 600 and the connection pattern 500 may be unnecessary. Further, the auxiliary electrode pattern 600 and the connection pattern 500 may be formed by the same process so that process efficiency may be improved. However, the insulation layer 700 may be formed for insulation between the connection pattern 500 and the first sensing pattern 100.

As illustrated in FIG. 3C, the auxiliary electrode pattern 600 may be formed in as a dot pattern. In this case, the auxiliary electrode pattern 600 may be separated or isolated at the portion intersecting the connection pattern 500, so that an additional insulation layer between the auxiliary electrode pattern 600 and the connection pattern 500 may be omitted. Thus, the auxiliary electrode pattern 600 and the connection pattern 500 may be formed by the same process and process efficiency may be improved. Further, the auxiliary electrode pattern 600 may be formed as the dot patterns so that visibility of the electrodes may be further decreased.

According to another embodiment of the present invention, as illustrated in FIG. 2, the first sensing pattern 100 may include a connection portion 120 which connect the respective unit patterns 110 thereof, and the connection portions 120 may have a narrower width than the unit pattern 110, so that the resistance may be increased at the connection portion 120.

Accordingly, in embodiments of the present invention, an auxiliary electrode pattern 600 may be further formed on the connection portion to overcome the above-described problem.

A shape of the auxiliary electrode pattern 600 is not particularly limited, however, from an aspect of decreasing the visibility, the auxiliary electrode pattern 600 may be formed in a thin pattern, a dot pattern as illustrated in FIG. 3C. In this case, when the dot pattern is not formed at a portion overlapping the connection pattern 500, insulation may be achieved without an additional insulation layer.

A material for forming the auxiliary electrode pattern 600 is not particularly limited, but the same material having appropriate conductivity as that of the sensing patterns and the first relay pattern 300 may be used, and a material having transparency and lower resistance may be preferably used in terms of improving the sensing sensitivity and decreasing the visibility. When forming the auxiliary electrode pattern 600 of the same material as that of the connection pattern 500, the auxiliary electrode pattern 600 and the connection pattern 500 may be formed simultaneously to improve process efficiency.

Insulation Layer

In the touch panel according to one embodiment of the present invention, when members or elements that require an insulation therebetween overlap each other, the insulation layer 700 may be formed.

In particular, according to one embodiment of the present invention, since the connection pattern 500 for electrically connecting the respective unit patterns of the second sensing pattern 200 needs to be insulated from the first sensing pattern 100, the insulation layer 700 may be formed between the connection pattern 500 and the first sensing pattern 100.

According to another embodiment of the present invention, the insulation layer 700 may be formed between the connection pattern 500 and the auxiliary electrode pattern 600.

A material for forming the insulation layer 700 is not particularly limited, and any compound having insulation properties commonly used in the related art may be used. For example, the insulation layer 700 may be formed in a desired pattern using an inorganic oxide such as silicon oxide or a photosensitive resin composition such as an acrylic resin, or a thermosetting resin composition. A compound having transparency may be preferably used.

Touch Panel

In the touch panel according to one embodiment of the present invention, any material commonly used in the related art may be used for the substrate without particular limitation thereof. For example, glass, polyethersulfone (PES), polyacrylate (PAR), polyetherimide (PEI), polyethylene napthalate (PEN), polyethylene terepthalate (PET), polyphenylene sulfide (PPS), polyallylate, polyimide, polycarbonate (PC), cellulose triacetate (TAC), cellulose acetate propionate (CAP), or the like, may be used. A material having transparency and flexibility may be preferably used.

In the touch panel according to one embodiment of the present invention, the first sensing pattern 100 and the second sensing pattern 200 may be disposed on different surfaces or the same surface of the substrate. When these patterns are disposed on the same surface, a thin film touch panel may be achieved, thus being more preferable.

The touch panel according to one embodiment of the present invention may further include a dummy pattern between the first sensing pattern 100 and the second sensing pattern 200 at a portion in which the second relay pattern 400 is not formed. In this case, visibility due to a difference in transmittance between a pattern region and a non-pattern region may be decreased, thus being preferable.

Method of Manufacturing Touch Panel

The touch panel according to the present invention may be formed by a method commonly performed in the related art.

Hereinafter, a method of forming a touch panel in a case where the respective sensing patterns are formed on the same surface of the substrate will described with reference to FIG. 4.

A first sensing patterns 100 (denoted by 100a and 100b) whose unit patterns are formed in a first direction while being connected by the connection portions, and a second sensing pattern 200 (denoted by 200a and 200b) whose unit patterns are formed in a second direction to be separated from each other with respect to the connection portion are formed on one surface of the substrate.

The first sensing pattern 100 and the second sensing pattern 200 are disposed in different directions from each other. Herein, the first direction may be an X-axis direction, and the second direction may be a Y-axis direction, for example, but it is not limited thereto.

The first sensing pattern 100 and the second sensing pattern 200 are formed on the same layer. The unit patterns of the first sensing pattern 100 are connected with each other through the connection portion, and the unit patterns of the second sensing pattern 200 are formed to be separated from each other in an island form.

The above-described sensing patterns may be formed by various thin film deposition techniques such as a physical vapor deposition (PVD) method, a chemical vapor deposition (CVD) method or the like. For example, these sensing patterns may be formed by a reactive sputtering which is an example of the PVD method.

In addition, the sensing patterns may be formed by a printing process. Various printing methods such as gravure off-set printing, reverse off-set printing, screen printing, gravure printing, etc., may be used. In particular, when using the printing process, the sensing patterns may be formed of a printable paste material. For example, the sensing patterns may be formed of a carbon nano tube (CNT), a conductive polymer, and Ag nano wire ink.

The sensing patterns may also be formed by a photolithography process.

The sensing patterns may be formed from the above-described materials and may be formed to have an appropriate thickness.

In example embodiments of the present invention, since the first relay patterns 300 may be formed in an island form at an inside of the first sensing patterns 100, when being formed by the same material and the same method as those of the above-described sensing patterns, the first relay pattern 300 may be simultaneously formed in one process using the same equipment without additional equipment and process, respectively. Thus, process efficiency may be improved.

In example embodiments of the present invention, since the second relay pattern 400 (denoted by 400a and 400b) may be formed between the first sensing pattern 100 and the second sensing pattern 200, when being formed by the same material and the same method as those of the above-described sensing patterns, the second relay pattern 400 may be simultaneously formed in one process using the same equipment without additional equipment and process, respectively. Thus, process efficiency may be improved.

In addition, a dummy pattern may be further formed between the first sensing pattern 100 and the second sensing pattern 200 in addition to the second relay pattern 400. The dummy pattern may be also formed by the same material and the same method as those of the above-described sensing patterns to improve process efficiency.

The first sensing pattern 100, the second sensing pattern 200, the first relay pattern 300, the second relay pattern 400 and the dummy pattern may be formed of the same material as each other.

Then, an insulation layer 700 is formed on the first sensing pattern 100. The insulation layer 700 may be formed for electrically insulating connection patterns 500 (denoted by 510a, 510b, 520a and 520b) and the first sensing pattern 100 from each other.

However, since the first relay pattern 300, the second relay pattern 400 and the second sensing pattern 200 need to be electrically connected with each other, the insulation layer 700 may be formed in a predetermined pattern to expose portions of the first relay pattern 300, the second relay pattern 400 and the second sensing pattern 200 so that they may be connected to each other by the connection pattern 500, which will be described below, or may be formed to include a contact hole at portions to be connected with the first relay pattern 300, the second relay pattern 400 and the second sensing pattern 200.

The insulation layer 700 may be formed of the above-described material.

Next, the connection pattern 500 for electrically connecting the first relay pattern 300, the second relay pattern 400 and the second sensing pattern 200 with each other is formed.

For example, a first connection pattern 510 (denoted by 510a and 510b) which connects the first relay pattern 300 formed at an inside of the first sensing pattern 100 and the second relay pattern 400 to each other, and a second connection pattern 520 (denoted by 520a and 520b) which electrically connects the second relay pattern 400 with each unit pattern of the second sensing pattern 200 may be formed. Herein, the connection patterns 510 and 520 may be formed so as be isolated from the first sensing pattern 100 by the insulation layer 700.

According to another embodiment of the present invention, the connection pattern 500 may be formed before a process of forming the sensing pattern. In this case, the connection pattern 500 may be formed, the insulation layer 700 may be formed, and then the first sensing pattern 100, the second sensing pattern 200, the first relay pattern 300 and the second relay pattern 400 may be simultaneously formed. Herein, in order to electrically connect the first relay pattern 300, the second relay pattern 400 and the second sensing pattern 200 by the connection pattern 500, the insulation layer 700 may be formed to expose portions of the first relay pattern 300, the second relay pattern 400 and the second sensing pattern 200 so that they may be connected with the connection pattern 500.

The connection pattern 500 may be formed of the above-described material.

Thereafter, an auxiliary electrode pattern 600 may be formed on one surface of the first sensing pattern 100. Herein, the auxiliary electrode pattern 600 may be formed to overlap a portion having a narrowed width of the first sensing pattern 100 around the first relay pattern 300.

In a method of manufacturing a touch panel according to one embodiment of the present invention, the auxiliary electrode pattern 600 may be formed on a lower surface of the first sensing pattern 100 (herein, the lower surface refers to a side opposite to a visible side based on a corresponding member). In this case, the auxiliary electrode pattern 600 may be formed on an upper surface (one surface) of the first sensing pattern 100, and the connection pattern 500 may be formed on the other surface of the first sensing pattern 100.

Firstly, the auxiliary electrode pattern 600 may be formed on a substrate, and then the first sensing pattern 100, the second sensing pattern 200, the first relay pattern 300 and the second relay pattern 400 may be formed so that the auxiliary electrode pattern 600 overlap the portion having the narrowed width around the first relay pattern 300.

Next, the insulation layer 700 and the connection pattern 500 may be formed by the above-described process.

Since the auxiliary electrode pattern 600 may be formed on a surface different from that of the second sensing pattern 200 and the connection pattern 500 for electrically connecting the second sensing patterns 200. Thus, an additional insulation layer may be omitted.

In embodiments of the present invention, the auxiliary electrode pattern 600 may be formed so as to extend on the portion having the narrowed width of the first sensing pattern 100 around the first relay pattern 300, and the connection pattern 500 may connect the first relay pattern 300 and the second relay pattern 400 with each other at the portion having the narrowed width. Accordingly, the auxiliary electrode pattern 600 and the connection pattern 500 may be disposed on one side of the first sensing pattern 100, and particularly, may be disposed on both sides with respect to the first relay pattern 300.

In a method of manufacturing a touch panel according to another embodiment of the present invention, the auxiliary electrode pattern 600 may be formed on an upper surface of the first sensing pattern 100 (herein, the upper surface refers to the visible side based on the corresponding member). In this case, the auxiliary electrode pattern 600 may be formed while being insulated from the second sensing pattern 200 and the connection pattern 500 for electrically connecting the unit patterns of the second sensing pattern 200.

In particular, firstly, the first sensing pattern 100, the second sensing pattern 200, the first relay pattern 300 and the second relay pattern 400 may be formed on the substrate.

Then, after forming the auxiliary electrode pattern 600 on the upper surface of the first sensing pattern 100, an insulation layer may be further formed on the upper surface thereof, and then the connection pattern 500 may be formed on the insulation layer.

According to another embodiment of the present invention, before forming the auxiliary electrode pattern 600, the insulation layer is previously formed on the substrate on which the first sensing pattern 100, the second sensing pattern 200, the first relay pattern 300 and the second relay pattern 400 are formed, and then the auxiliary electrode pattern 600 may be formed to extend on the portion having the narrowed width of the first sensing pattern 100 around the first relay pattern 300

In a method of manufacturing a touch panel according to another embodiment of the present invention, the auxiliary electrode pattern 600 may be formed in a predetermined pattern so that a portion thereof interesting the connection pattern 500 may be divided or separated. In this case, an additional insulation layer may be omitted between the auxiliary electrode pattern 600 and the connection pattern 500. Accordingly, the connection pattern 500 and the auxiliary electrode pattern 600 may be formed on the same surface, and thus a thin film touch panel may be achieved. When the connection pattern 500 and the auxiliary electrode pattern 600 are formed by the same material and the same method, process workability efficiency may be also significantly improved.

In addition, the auxiliary electrode pattern 600 may be formed as dot patterns. In this case, when the dot pattern may not be formed at a portion at which the auxiliary electrode pattern 600 and the connection pattern 500 intersect, a process of forming an additional insulation layer may be omitted, so that process efficiency may be improved, and visibility of the auxiliary electrode pattern 600 may be decreased.

In a method of manufacturing a touch panel according to another embodiment of the present invention, the auxiliary electrode pattern 600 may be further formed on a connection portion 120 of the first sensing pattern 100.

Image Display Device

Further, the present invention provides an image display device including the touch panel. The image display device according to embodiments of the present invention may include a flat panel displays such as a liquid crystal display (LCD), field emission display (FED), plasma display panel (PDP), organic light emitting diode (OLED), or the like.

Hereinafter, preferred embodiments will be described to more concretely understand the present invention with reference to examples. However, it will be apparent to those skilled in the art that such embodiments are provided for illustrative purposes and various modifications and alterations may be possible without departing from the scope and spirit of the present invention, and such modifications and alterations are duly included in the present invention as defined by the appended claims.

EXAMPLES AND COMPARATIVE EXAMPLES (1) Example 1

A touch panel having the same structure as that of the touch panel illustrated in FIG. 1 was manufactured.

Specifically, first sensing patterns, first relay patterns, second sensing patterns, and second relay patterns were formed on a glass (refractive index: 1.51, extinction coefficient: 0) in a thickness of 40 nm using an ITO film (refractive index: 1.8, extinction coefficient: 0). The first sensing patterns, the first relay patterns, the second sensing patterns, and the second relay patterns were simultaneously formed by the same process.

Then, an insulation layer was formed on a position in which the first connection pattern of the first sensing pattern will be disposed using an acrylic insulating material (refractive index: 1.51, extinction coefficient: 0), a first connection pattern which connects the first relay pattern and the second relay pattern, and a second connection pattern which connects the second relay pattern and a unit pattern of the second sensing pattern were respectively formed on the insulation layer. The connection patterns were formed of an Ag—Pd—Cu alloy (thickness 200 nm).

(2) Example 2

A touch panel was manufactured according to the same procedures as described in Example 1, except that an auxiliary electrode pattern was further formed on an intersection portion of the first sensing pattern and the first connection pattern using an Ag—Pd—Cu alloy (thickness 200 nm), and an insulation layer was interposed between the auxiliary electrode pattern and the first connection pattern so as to be insulated from each other.

(3) Example 3

A touch panel was manufactured according to the same procedures as described in Example 2, except that an auxiliary electrode pattern was further formed on a connection portion of the first sensing pattern.

(4) Example 4

Figure 4:
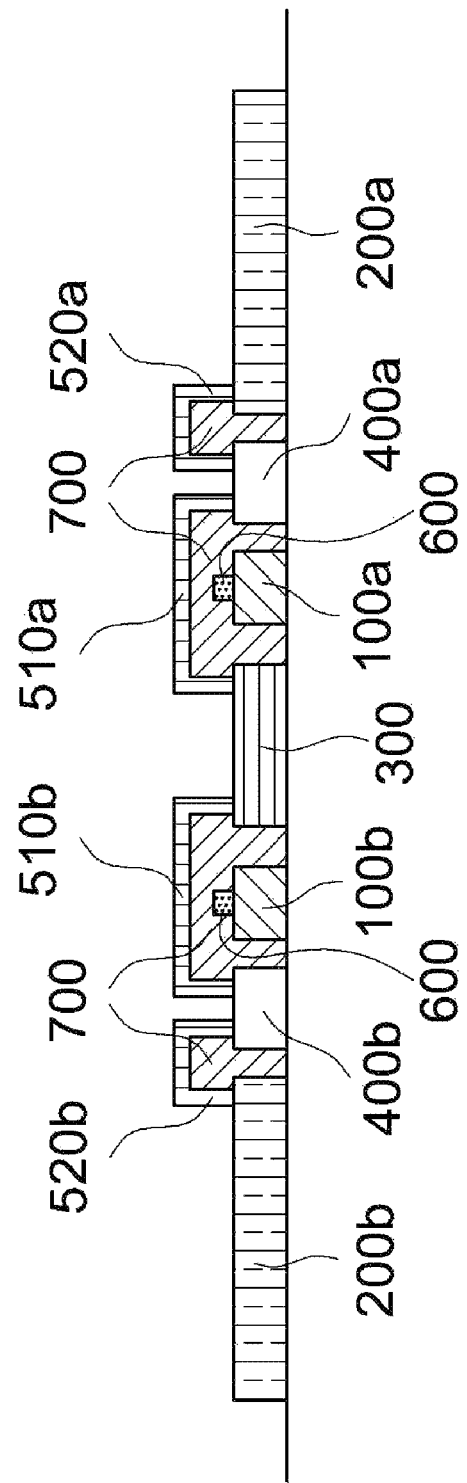
FIG. 4 is a cross-sectional view illustrating a touch panel according to some embodiments of the present invention.

A touch panel was manufactured according to the same procedures as described in Example 1, except that, as illustrated in FIG. 4, an auxiliary electrode pattern was formed in a dot pattern on the intersecting portion of the first sensing pattern and the first connection pattern intersect using an Ag—Pd—Cu alloy (thickness 200 nm). The first connection pattern and the auxiliary electrode pattern were simultaneously formed in the same process so that two dot patterns were separated.

(5) Comparative Example 1

A touch panel was manufactured according to the same procedures as described in Example 1, except that the first relay pattern and the unit patterns of the second sensing pattern were directly connected by a pair of connection patterns without the second relay pattern.

Test Procedure (1) Evaluation of Resistance Deviation

Channel resistances of the first sensing patterns and the second sensing patterns of the touch panels manufactured according to the examples and comparative example were respectively measured, and resistance deviations ware calculated. Results thereof are described in Table 1 below.

As the resistance deviation between the sensing patterns is increased, sensitivity of electrode and touch sensitivity are decreased.

(1) Evaluation of Visibility 10 expert panels visually observed the touch panels manufactured according to the examples and comparative example to determine whether the touch sensing electrode, the connection pattern, or the auxiliary electrode pattern were viewed, and the number of the test panels determining to view the above patterns was counted, and the results are shown in Table 1 below.

TABLE 1

| Section | Resistance of first sensing pattern (Ω/□) (A) | Resistance of second sensing pattern (Ω/□) (B) | Resistance deviation (%) | Evaluation of visibility (persons) |
|---|---|---|---|---|
| Example 1 | 742.92 | 518.82 | 43 | 1 |
| Example 2 | 545.57 | 423.34 | 29 | 5 |
| Example 3 | 421.18 | 517.29 | −19 | 7 |
| Example 4 | 585.72 | 517.38 | 13 | 3 |
| Comparative Example 1 | 742.92 | 422.19 | 76 | 9 |

Referring to Table 1, it could be confirmed that, in all the touch panels of the examples, resistance deviations of the first sensing pattern and the second sensing pattern were significantly deceased, compared to the touch panels of the comparative example. From this result, it can be seen that the touch panels of the examples have excellent sensitivity and accuracy, compared to the touch panels of the comparative example.

What is claimed is:

1. A touch panel comprising:
a substrate; and
a touch sensing electrode formed on at least one surface of the substrate, the touch sensing electrode including:
a first sensing pattern formed in a first direction;
a second sensing pattern formed in a second direction;
a first relay pattern formed at an inside of the first sensing pattern in an island form;
a second relay pattern formed between the first sensing pattern and the second sensing pattern; and
a connection pattern which electrically connect separated unit patterns of the second sensing pattern via the first relay pattern and the second relay pattern,
wherein the connection pattern includes a first connection pattern which connects the first relay pattern and the second relay pattern, and a second connection pattern which connects the second relay pattern and the unit pattern of the second sensing pattern.

2. The touch panel according to claim 1, wherein the connection pattern is formed in a pair to connect the separated unit patterns of the second sensing pattern adjacent to each other.

3. The touch panel according to claim 1, further comprising an insulation layer interposed between the connection pattern and the first sensing pattern.

4. The touch panel according to claim 1, further comprising an auxiliary electrode pattern formed on one surface of the first sensing pattern.

5. The touch panel according to claim 4, wherein the auxiliary electrode pattern extend on a portion having a narrowed width of the first sensing pattern around the first relay pattern.

6. The touch panel according to claim 4, wherein the auxiliary electrode pattern and the connection pattern are disposed on one side of the first sensing pattern.

7. The touch panel according to claim 6, wherein the auxiliary electrode pattern is divided at an intersecting portion of the connection pattern and the auxiliary electrode pattern.

8. The touch panel according to claim 4, wherein the auxiliary electrode pattern is formed in dot patterns.

9. The touch panel according to claim 4, further comprising an insulation layer interposed between the connection pattern and the auxiliary electrode pattern.

10. The touch panel according to claim 4, wherein the auxiliary electrode pattern is disposed on one surface of the first sensing pattern, and the connection pattern is disposed on the other surface of the first sensing pattern.

11. The touch panel according to claim 4, wherein the auxiliary electrode pattern and the connection pattern are formed of the same material.

12. The touch panel according to claim 1, wherein the first sensing pattern includes a connection portion which connects respective unit patterns thereof, and the connection portion includes an auxiliary electrode pattern.

13. The touch panel according to claim 1, wherein the first sensing pattern and the second sensing pattern are disposed on the same surface of the substrate.

14. The touch panel according to claim 1, further comprising a dummy pattern between the first sensing pattern and the second sensing pattern.

15. An image display device comprising the touch panel according to claim 1.

* * * * *